Jan. 24, 1967 D. A. GARRETT 3,299,981
CHAIN-DRIVEN ARTICULATING FRAME VEHICLE
Filed Feb. 25, 1966 4 Sheets-Sheet 3
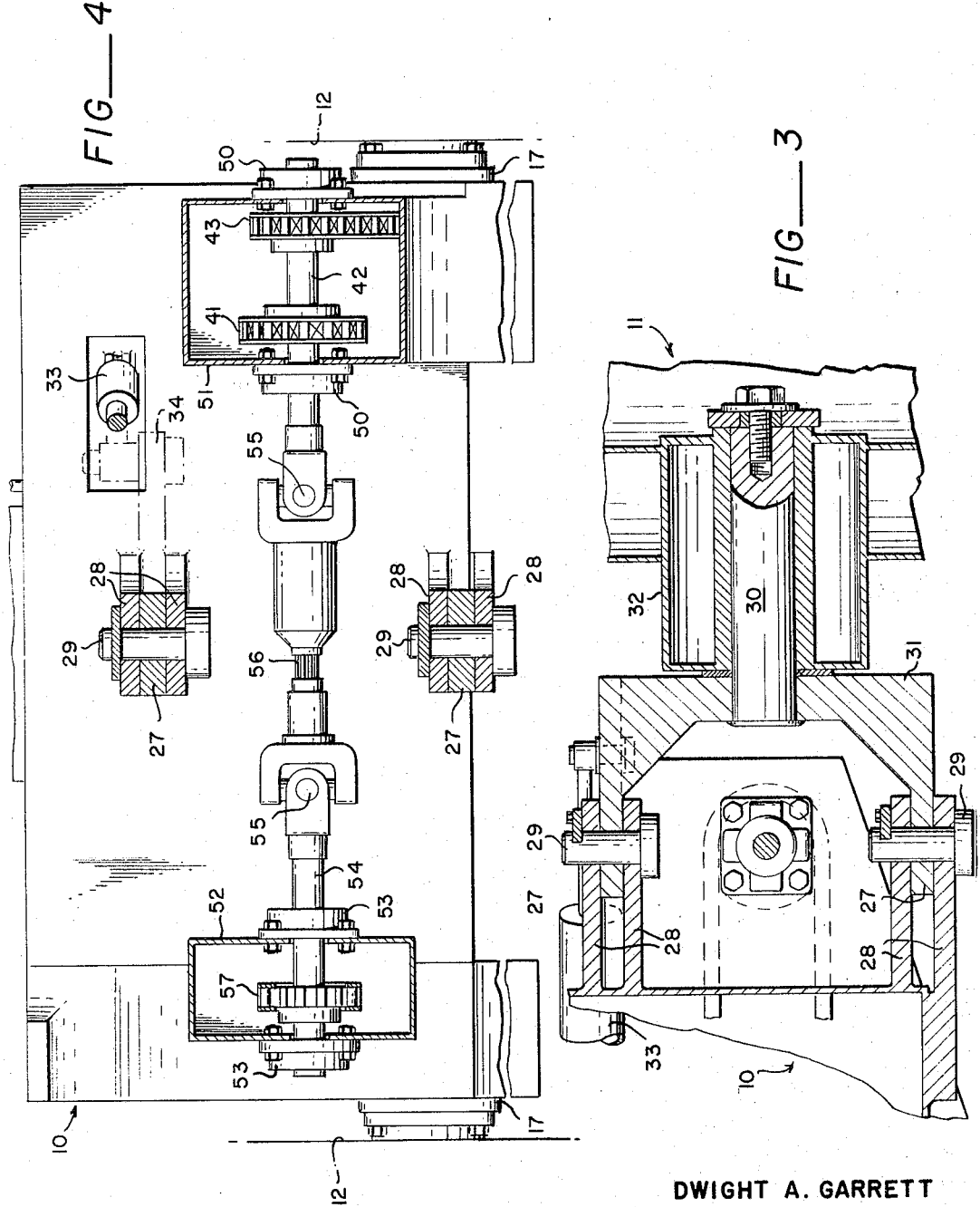
DWIGHT A. GARRETT
INVENTOR.
BY *Seed & Berry*
ATTORNEYS Jan. 24, 1967     D. A. GARRETT     3,299,981
CHAIN-DRIVEN ARTICULATING FRAME VEHICLE
Filed Feb. 25, 1966     4 Sheets-Sheet 4
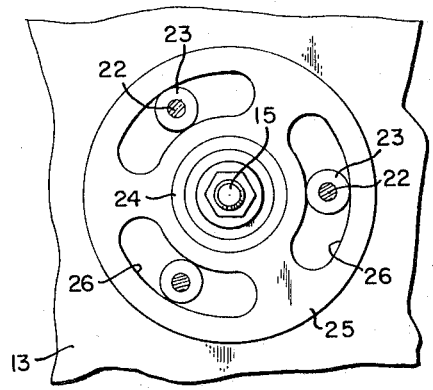
FIG__6
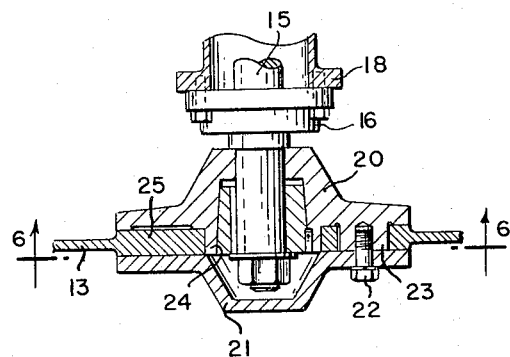
FIG__5
DWIGHT A. GARRETT
INVENTOR.
BY
ATTORNEYS

United States Patent Office 3,299,981
Patented Jan. 24, 1967

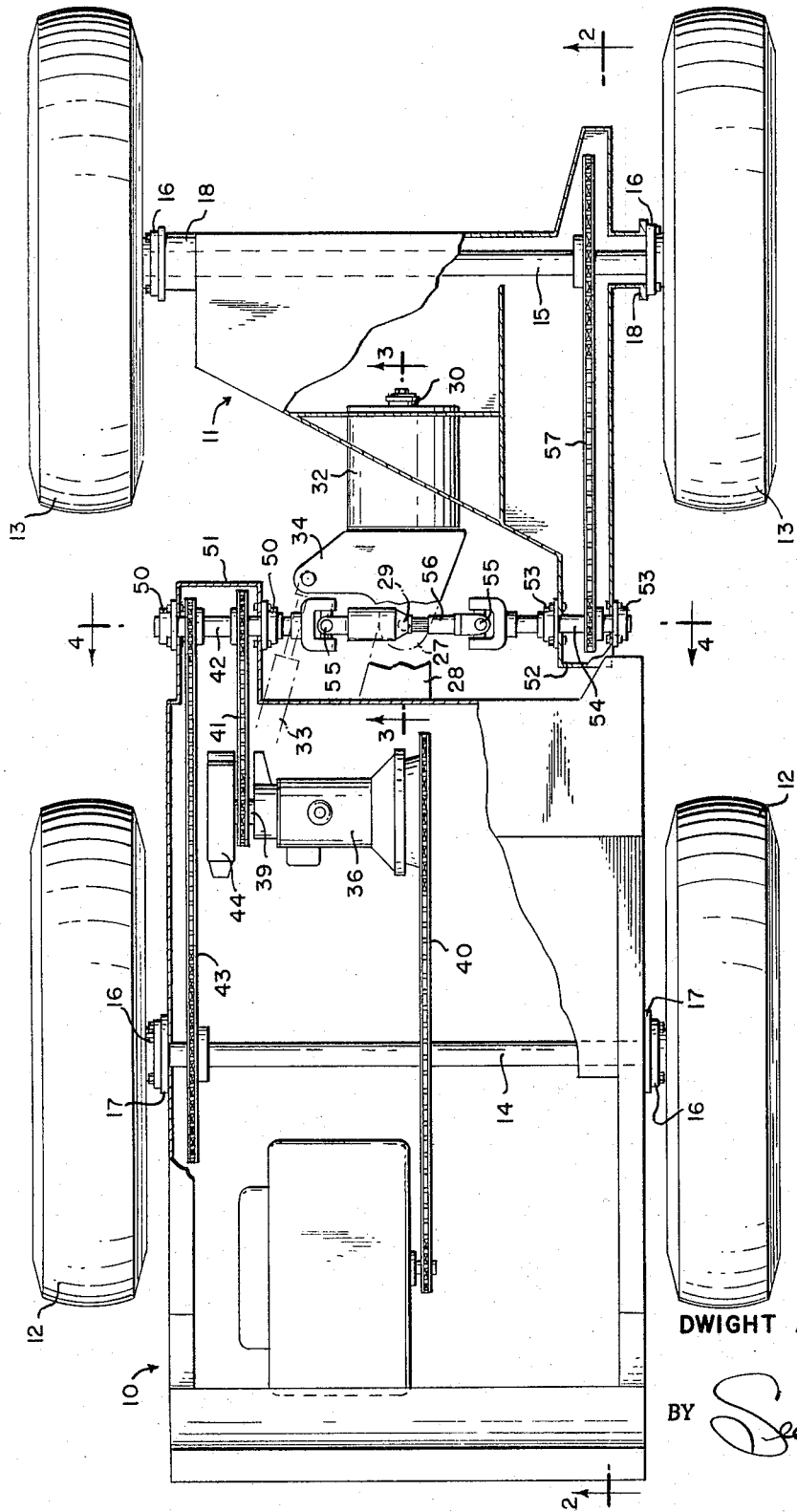
FIG—1

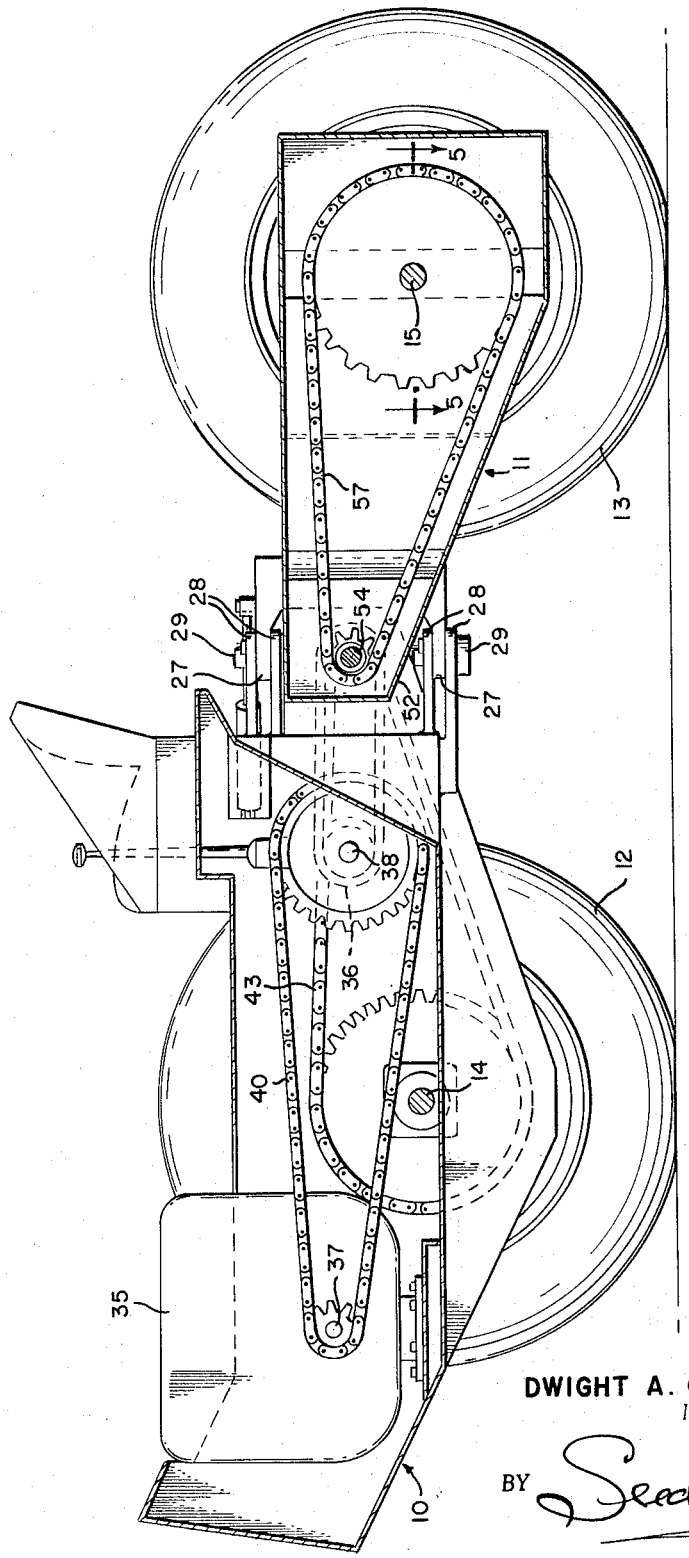

---

3,299,981
CHAIN-DRIVEN ARTICULATING FRAME VEHICLE
Dwight A. Garrett, Enumclaw, Wash., assignor to Garrett Enumclaw Co., Enumclaw, Wash., a corporation of Washington
Filed Feb. 25, 1966, Ser. No. 530,134
11 Claims. (Cl. 180—51)

The present application is a continuation-in-part of my application Serial Number 444,138, filed March 31, 1965.

This invention relates to a tractor vehicle of the type providing front and rear frame sections each supporting an axle for a respective pair of driven ground wheels, and between the two frame sections having a yoke connected to one frame section for swing motion of the yoke about a vertical axis located on the longitudinal median line of the section and connected to the other frame section for swivel motion about a horizontal axis which traverses the swing axis and occupies the longitudinal median line of the latter frame section. The swing movement is under the control of the operator and serves as the instrumentality by which the vehicle is steered. The swivel movement compensates the two frame sections to irregularities in the ground over which the vehicle travels. Power is taken from a single engine mounted on one of the two frame sections for driving the two sets of wheels in concert.

For its general object the invention aims to provide a vehicle of the described character having a perfected system for passing the drive from the engine to the two axles which is considerably simpler and more inexpensive to construct, and easier and cheaper to maintain, than drive systems which have been heretofore devised for the type of vehicle to which the present invention pertains.

More particularly, the invention aims to provide a vehicle of the described character having an advanced form of chain drive for transmitting power from the engine to the two axles.

The invention has the further and particular object of providing as a complement to the chain drive a simple means allowing one ground wheel to be driven at an over-running speed where negotiated turns or variables in the road surface would otherwise cause tire scuffing.

The above and yet further objects and advantages in view will appear and be understood in the course of the following description and claims, the invention consisting in the novel construction and in the adaptation and combination of parts hereinafter described and claimed.

In the accompanying drawings:

FIGURE 1 is a top plan view illustrating the chassis of a tractor vehicle constructed to embody preferred teachings of the present invention.

FIG. 2 is a transverse vertical sectional view thereof on line 2—2 of FIG. 1.

FIG. 3 is a fragmentary longitudinal vertical sectional view drawn to an enlarged scale on line 3—3 of FIG. 1.

FIG. 4 is a transverse vertical sectional view drawn to an enlarged scale on line 4—4 of FIG. 1.

FIG. 5 is a fragmentary horizontal sectional view drawn to an enlarged scale on line 5—5 of FIG. 2; and FIG. 6 is a fragmentary longitudinal vertical sectional view on line 6—6 of FIG. 5.

Referring to said drawings, the front and rear frame sections are denoted by the numerals 10 and 11, respectively. For each section a respective one of two ground wheels is carried upon each of the two ends of a live axle. The two sets of ground wheels are designated by 12 and 13, and the two live axles by 14 and 15. The axles receive a journal mounting from bearings 16 which are bolted to hollow bosses, as 17 and 18, projecting laterally from opposite sides of the frame sections. In order to provide a differential action as between the two ground wheels of each frame section, a respective limited-slip drive coupling is introduced between each ground wheel and the related axle. The driving component of the drive coupling comprises a split case having a base member 20 which is fixed upon the related end of the axle, and a cap member 21 secured by bolts 22 to the base member. The bolts clamp the cap member against three equidistantly spaced studs 23 which surround an annular neck 24 and, with said neck, lie concentric to the center of the split case. The wheel presents a smooth-faced hub 25 serving as the driven component of the drive coupling. The hub, with slip tolerance, is housed between said base and cap members 20–21 and takes a journal from the neck 24. Arcuate slots 26 are formed in the hub to take a lost-motion drive from the studs. It will be apparent that the described drive coupling permits one wheel to over-run the other. As here shown, the permitted lost motion is 66°, a sufficient "float" to preclude tire scuffing under the working conditions which the tractor normally encounters.

For the articulation of the two frame sections a yoke is provided. Each of the two tongues 27 of the yoke fits between the arms 28 of a respective one of two vertically spaced horizontal forks which project rearwardly as rigid prolongations of the front frame section 10 on the substantial longitudinal median line of the latter. The tongues are hingedly connected to the forks by king pins 29 for swing movement about a coinciding vertical axis. A stem 30 which is welded or otherwise rigidly secured to the cross-arm 31 of the yoke extends rearwardly therefrom and is journaled for swivel movement about a longitudinal axis normal to the hinge axis within a muff 32 fabricated into the rear frame section. The swivel mounting permits one frame section to rock freely relative to the other in compensation of ground irregularities. The hinge movement is controlled by a hydraulic jack 33 extending longitudinally of the tractor between the front frame section and a laterally extending lever arm 34 of the yoke, and performs the steering function.

The engine 35 for the tractor is carried by the front frame section, occupying a position to the front of a transmission 36. The axis of the engine's output shaft 37, and that of the transmission's input and output shafts 38 and 39, respectively, are disposed transversely of the frame section. A housed chain 40 passes a reduction drive from shaft 37 to shaft 38, and a housed chain 41 carries the drive rearwardly from shaft 39 to a paralleling jack-shaft 42. A reduction drive is passed by a chain 43 forwardly from the jack-shaft to the front axle 14. The drum for a band brake 44 is fixed to said shaft 39.

The jack-shaft 42 is journaled in bearings 50 for rotation about a transverse horizontal axis traversing the axis about which the articulating frame sections swing. These bearings are carried upon the side walls of a boxed rearward prolongation 51 of the front frame section. Such prolongation parallels and is spaced to one side of the longitudinal median line of the front frame section.

The rear frame section has a similarly boxed forwardly extending prolongation 52 which likewise is located in paralleling spaced relation to the longitudinal median line of the section, albeit at the side of the hinge axis opposite that occupied by the prolongation 51. Bearings 53 are carried upon the side walls of such latter prolongation and support a jack-shaft 54 so that the latter rotates about a transverse axis which coincides with the axis of the jack-shaft 42 when the longitudinal median lines of the two frame sections coincide. Inner ends of the jack shafts 42 and 54 are spaced in a moderate degree from said swing axis of the articulating sections and connect by universals 55 with an intervening drive-transferring short spindle 56 comprised of spline-connected telescoping sections. The boxed prolongations 51 and 52 respectively give housed protection to the rear end of the chain 41 and to the front end of a chain 57 which passes the drive rearwardly from a sprocket wheel fixed to the jack shaft 54 to a sprocket wheel fixed to the rear axle 15. The tooth ratio between said sprocket wheels which carry the drive to the rear axle provides the same reduction as that given to the front axle by the sprocket wheels for the chain 43.

For simplicity in illustration I have deleted any showing of working equipment, such as a dozer blade, material-handling head, high-arch or the like, with which the tractor is or may be rigged. The invention pertains only to the advanced drive system, applied to a 4-wheel drive vehicle having front and rear frame sections which articulate for swing motion about a vertical axis and admit to relative rocking action about a longitudinally extending horizontal axis. It is thought that the novel manner in which the drive is passed from an engine carried by one frame section to the four driven wheels will have been clear from the foregoing detailed description of my now preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A steerable vehicle comprising: a 2-wheeled front frame section providing at its rear end a pair of vertically spaced arms pointing rearwardly on the longitudinal median line of the section, a 2-wheeled rear frame section, the two wheels of each frame section being carried by the section, one wheel at each of the two sides of the related section, for rotation about a coinciding transverse horizontal axis which is fixed in relation to the concerned frame section, a yoke providing an upright cross-arm connecting two vertically spaced horizontal tongues and occupying an intervening position between the frame sections with its two tongues pointing forwardly, co-axial upper and lower king pins each hingedly connecting a respective tongue to a respective one of said arms of the front frame section for swing movement about a vertical axis, a connection between the cross-arm of the yoke and the rear frame section permitting the rear frame section to swivel relative to the yoke about a horizontal axis extending longitudinally of the rear frame section but precluding relative motion in any other direction, jack-shafts, one for each frame section, journaled at the inner ends of the frame sections for rotation about transverse horizontal axes which traverse said vertical axis of the king pins and coincide when the longitudinal median lines of the frame sections are in an in-line relation, said jack-shatfs having their inner ends spaced apart, a drive shaft extending between and coupled by universals with said inner ends of the jack-shafts, a power plant carried by one of the frame sections, a driving connection from the power plant to the jack-shaft of the related frame section, and a respective driving connection from each jack-shaft to the ground wheels of the related section.

2. A steerable vehicle as claimed in claim 1 in which each of said driving connections is a chain drive.

3. A steerable vehicle as claimed in claim 2, each jack-shaft being supported by a box body extending as a prolongation of the concerned frame section in paralleling spaced relation to the longitudinal median line of the section, the chains which drive said jack-shafts being housed by said boxed prolongations.

4. A steerable vehicle as claimed in claim 1 having a transmission located between the power plant and the jack-shaft of the related frame section, said power plant and the transmission being disposed cross-wise to the section to have the output shaft of the power plant and the input and output shafts of the transmission lie parallel to the jack-shaft of the concerned frame section and by such paralleling permit a direct chain drive from the output shaft of the power plant to the input shaft of the transmission and from the output shaft of the transmission to the jack-shaft.

5. A steerable vehicle as claimed in claim 1, the drive system including a respective limited-slip differential for each of the four ground wheels.

6. A steerable vehicle as claimed in claim 1, said driving connection from each jack-shaft to the related ground wheels comprising: a chain passing the drive to a live axle related to both wheels, and a respective limited-slip differential passing the drive from the axle to each ground wheel.

7. A steerable vehicle as claimed in claim 6, wherein a respective split case is provided upon each end of each axle; the components of the split case comprising boltably interconnected base and cap parts which contain the hub of the concerned wheel between the two, thus to hold the hub against motion endwise to the axle, and are formed to provide a journal on which the hub turns relative to the axle about the center of the axle as an axis, the limited-slip differentials comprising, for each wheel, a respective lost-motion connection between the case and the wheel hub restricting said relative turn to a partial revolution.

8. A steerable vehicle comprising: a 2-wheeled front frame section supporting a power plant and at the rear end providing vertically spaced arms pointing rearwardly on the longitudinal median line of the section, a 2-wheeled rear section having a forwardly pointing horizontal muff located on the longitudinal median line of the section, the two wheels of each section being carried upon the outer ends of a respective live axle journaled from the concerned frame section for rotation about a transverse horizontal axis, a yoke providing a cross-arm from which a stem points rearwardly and two vertically spaced tongues point forwardly, the stem being journaled in the muff for swivel movement about a horizontal axis extending longitudinally of the rear section, co-axial upper and lower king pins each hingedly connecting a respective tongue to a respective one of said arms of the front frame section for swing movement about a vertical axis, a double-acting hydraulic jack extending between the front frame section and the yoke for swinging the yoke so as to steer the vehicle, said frame sections each having a prolongation extending rearwardly in the instance of the front section and forwardly in the instance of the rear section one spaced to one side and the other spaced to the other side of the swing axis, respective jack-shafts journaled from said prolongations for rotation about transverse generally horizontal axes which each traverse said swing axis in the space between the two arms of the yoke and coincide when the longitudinal median lines of the two sections are in an in-line relation, the inner ends of said jack-shafts being transversely spaced apart, a telescoping drive shaft extending transversely between said inner ends of the jack-shafts in the space between the king pins and connected by universals with said shaft ends, chains on the front section passing drive from the power plant both to the jack-shaft which is carried by the front section and to the front axle, said drive being passed by the telescoping drive shaft to the other of the two jack-shafts, and a chain on the rear section for passing the drive from the latter jack-shaft to the rear axle.

9. A steerable vehicle as claimed in claim 8 having a transmission located between the power plant and said jack-shaft which is carried by the front frame section, the power plant and the transmission being disposed crosswise to the front section to have the output shaft of the power plant and the input and output shafts of the transmission lie parallel to said front jack-shaft, said chains on the front section comprising a first chain reduction-driving the transmission from the power plant, a second chain driving the concerned jack-shaft from the transmission, and a third chain reduction-driving the front axle.

10. A steerable vehicle as claimed in claim 9 having a brake mechanism functional to the output shaft of the transmission.

11. A steerable vehicle as claimed in claim 8, wherein a respective wheel mounting is provided upon each end of each axle holding the concerned wheel against motion end-wise to the axle but permitting the wheel to turn relative to the axle about the center of the axle as an axis, and at each end of said axles having a respective lost-motion connection between the axle and the wheel producing a limited-slip differential by holding said relative turn to a partial revolution.

References Cited by the Examiner
UNITED STATES PATENTS

| | | | |
|---|---|---|---|
| 652,648 | 6/1900 | Sommer | 180—51 |
| 1,262,049 | 4/1918 | Hollis | 180—76 |
| 1,343,979 | 6/1920 | Livermore | 180—50 |
| 1,373,981 | 4/1921 | Smith | 180—50 |
| 1,623,214 | 4/1927 | Storey | 180—50 |
| 2,340,149 | 1/1944 | Slack | 180—70 X |
| 2,656,001 | 10/1953 | Wolf | 180—76 |
| 2,835,397 | 5/1958 | Wagner. | |
| 3,049,186 | 8/1962 | Garrett | 180—51 |

A. HARRY LEVY, *Primary Examiner.*